E. P. SEARING.
BEARING FOR QUILLING MACHINES AND THE LIKE.
APPLICATION FILED MAR. 12, 1917.
1,234,223.  Patented July 24, 1917.
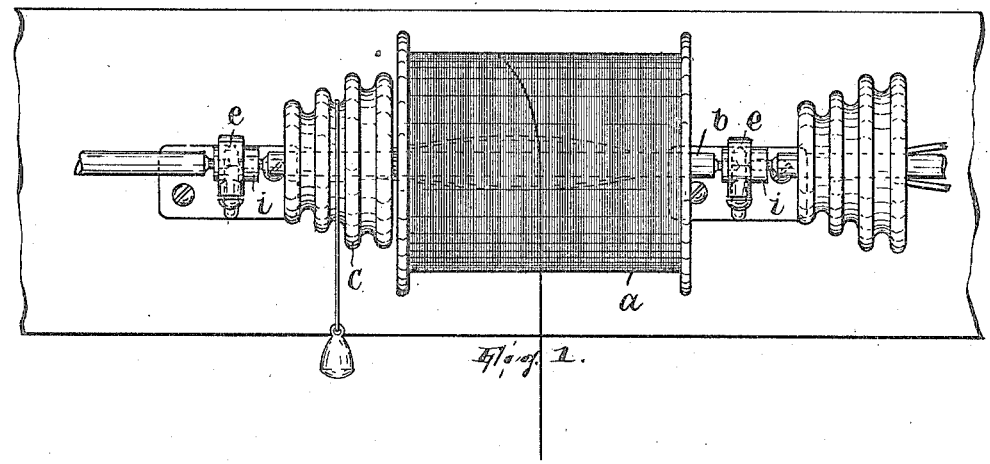
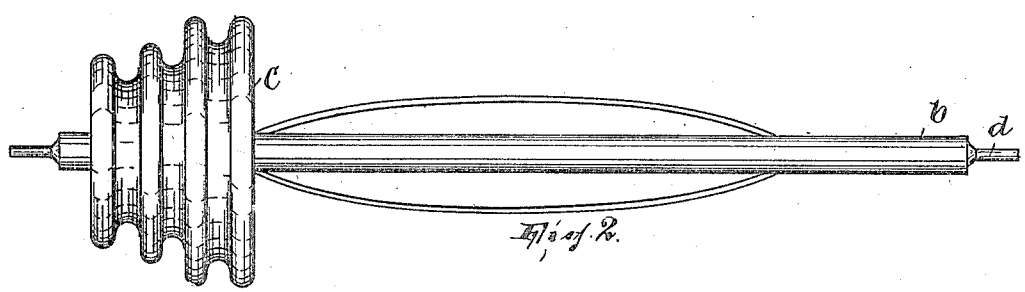
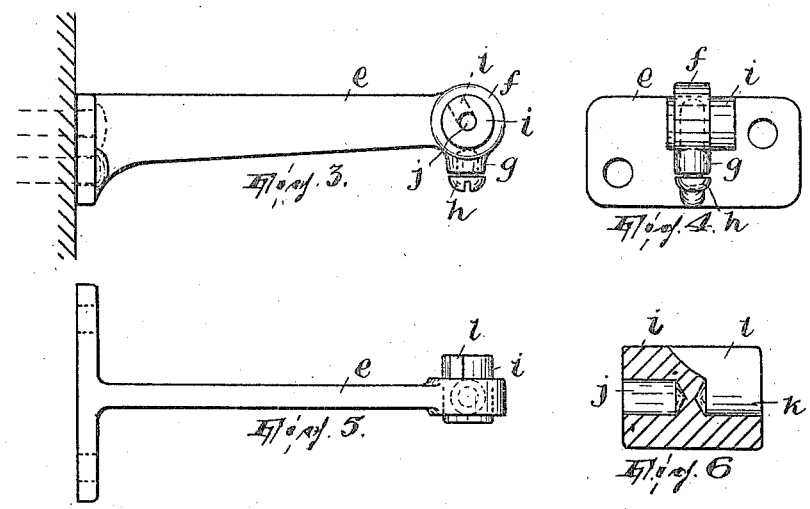
WITNESS  
INVENTOR,  
Eugene P. Searing.  
BY  
ATTORNEY.

UNITED STATES PATENT OFFICE.

EUGENE P. SEARING, OF PATERSON, NEW JERSEY.

BEARING FOR QUILLING-MACHINES AND THE LIKE.

1,234,223.  Specification of Letters Patent.  Patented July 24, 1917.

Application filed March 12, 1917.  Serial No. 154,247.

*To all whom it may concern:*

Be it known that I, EUGENE P. SEARING, a citizen of the United States, residing at Paterson, in the county of Passaic and State of New Jersey, have invented certain new and useful Improvements in Bearings for Quilling-Machines and the like, of which the following is a specification.

This invention relates to bearings for the horizontal spindles or equivalent axial supports of supply bobbins or spools, such as are employed in quilling machines, and its principal object is to provide supports for the spindle or equivalent whereby the minimum amount of friction may be opposed to the rotation of the spool, and whereby certain adjustments may be effected. According to my invention there is a bracket in which an indurated non-metallic bearing member is mounted. By employing such a bearing in place of a metal bearing I can reduce the diameter of the bearing portion or journal of the spindle or equivalent and thus obtain greatly reduced friction, so that since the resistance to rotation which the spool offers is reduced, much weaker thread can be handled; nevertheless thus reducing the diameter of the journal of the spindle does not shorten its life appreciably, because by the use of the described material for the bearing a metal-to-metal contact is avoided. Preferably the bearing member penetrates the bracket and affords bearing cavities or recesses for two adjoining spindles or equivalent spool supports and is adjustable both longitudinally of the axes of the spools and rotatively.

In the drawing,

Figure 1 is a front elevation, showing a spool having its supporting spindle journaled in two bearing supports constructed according to this invention;

Fig. 2 shows the preferred form of spindle or axial support for the spool;

Fig. 3 is a side elevation, Fig. 4 an end elevation and Fig. 5 a plan of one of the bearing supports or brackets; and, Fig. 6 is a longitudinal sectional view of one of the bearings-proper.

In Fig. 1 $a$ designates the spool or bobbin and $b$ its axial support or spindle, the same having the usual brake-pulley $c$ thereon. As shown in Fig. 2 the journals or bearing portions $d$ of this spindle, when the spindle is employed with my improved supporting means therefor, instead of being left the same diameter as the spindle, may be turned down to considerably smaller diameter than the same. This, with a bearing to substantially correspond therewith in diameter, reduces the frictional resistance of the spindle to rotation, besides minimizing the vibration and making a steadier rotary action, which play an important part in straining the thread being delivered from the spool on the spindle and have heretofore been so considerable as to prevent the weaker grades of threads from being handled successfully.

$e$ designates the brackets to support the spindles. The free end of each bracket is in the construction actually shown formed as an annulus $f$ whose axis is horizontal and as having a boss $g$ on the outside in which is tapped a radial set screw $h$.

The annular portion $f$ of each bracket receives a bearing member $i$ composed of, in the present instance, fiber; but it may be composed of some other indurated preferably non-metallic material that is adapted to withstand the wear incident to constant friction. This bearing member is preferably snugly received in the portion $f$ of the bracket and is held therein by the set-screw $h$, preferably so that it may be readily adjusted either longitudinally of the axis of the annulus or rotatively therein; to this end the annulus is interiorly circular and the member $i$ is exteriorly circular from end to end, or plain-cylindrical, except for one of its bearing recesses, as will be explained.

To afford the bearing recesses in this member $i$ I drill therein from one end the hole $j$ and from the other end the hole $k$, so that both are preferably concentric with the axis of said member and so that they do not meet (Fig. 6). One of the holes, as $k$, is formed open throughout its length to the periphery of said member, producing in effect a slot, as $l$, having a part-cylindrical bottom; this may be done by applying a rotary cutter to the member $i$ so that the cutter operates radially toward and in the same plane as the axis of said member, or it may be otherwise effected. The bearing recess $k^1$ thus formed, it will be understood, permits one journal of the spindle, after the other has been entered into the bearing recess $j$ of another such member $i$, to be entered laterally thereinto.

The brackets have their members $i$ arranged in axial alinement with each other. By adjusting the members $i$ therein longitudinally of their common axis the desired center-to-center spacing of the bearings for a series of spindles may be effected with absolute precision, which is a distinct advantage over the ordinary construction where, since the bearings are integral with the brackets, imperfections in casting make only an approximately regular spacing of the bearings possible. By adjusting the members $i$ rotatively they can be set so that the slot-shaped bearing recesses $k^1$ thereof are at the proper angle (Fig. 3) to permit the easiest entry thereto and removal therefrom of the spindle journal consistent with preventing such journal from possibly being drawn out of the bearing recess by the pull of the thread and its tendency to roll said journal up the forward side of the slot.

In actual practice my construction has made it possible to handle much weaker thread and attain much higher draft speeds than are possible where the spool spindles are mounted in the usual bearings consisting of bearing recesses drilled or otherwise formed directly in the ends of the brackets.

Having thus fully described my invention, what I claim as new and desire to secure by Letters Patent is:—

1. A bearing support for a horizontal spindle including a bracket and a bearing member of indurated non-metallic material fitted in said bracket, said member having oppositely open bearing recesses therein.

2. A bearing support for the adjoining ends of alined horizontal spindles including a bracket and a bearing member adjustably held in the bracket and having oppositely open bearing recesses adapted to receive said ends.

3. A bearing support for the adjoining ends of alined horizontal spindles including a bracket and a bearing member adjustably held in the bracket and having oppositely open bearing recesses adapted to receive said ends, one of said bearing recesses being a radial slot.

4. A bearing support for the adjoining ends of alined horizontal spindles including a bracket and a bearing member adjustable in the bracket rotatively of its bearing axis and having oppositely open bearing recesses adapted to receive said ends, one of said bearing recesses being a radial slot.

In testimony whereof I affix my signature.

EUGENE P. SEARING.